June 30, 1959 G. F. ABBOTT, JR 2,892,895
PERMANENT SIGNAL ALARM CIRCUIT
Filed March 7, 1955
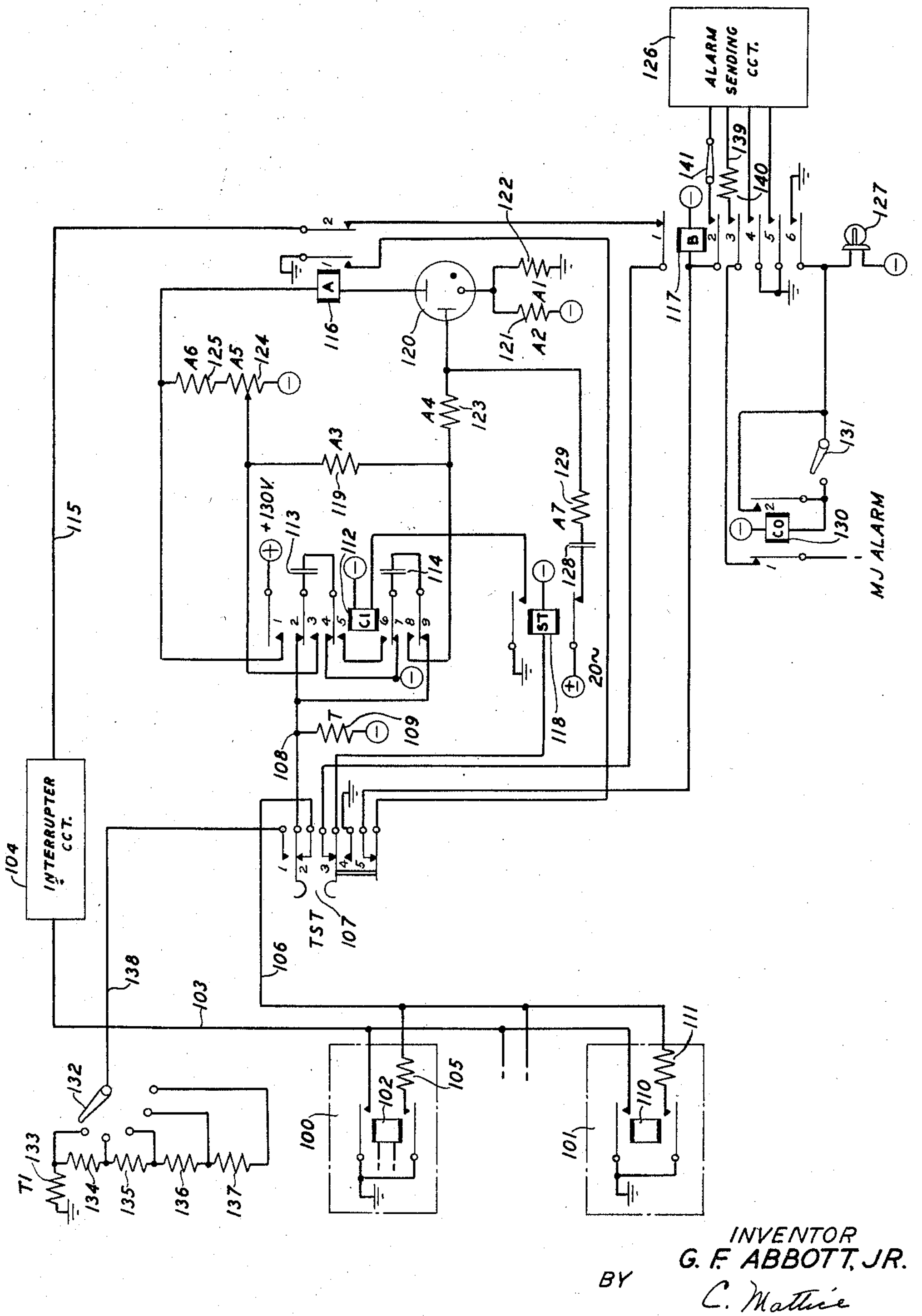
INVENTOR
G. F. ABBOTT, JR.
BY C. Mattice
ATTORNEY

United States Patent Office 2,892,895

Patented June 30, 1959

2,892,895

PERMANENT SIGNAL ALARM CIRCUIT

George F. Abbott, Jr., New York, N.Y., assignor to Bell Telephone Laboratories, Incorporated, New York, N.Y., a corporation of New York Application March 7, 1955, Serial No. 492,600

2 Claims. (Cl. 179—27)

This invention relates to telephone systems and has for one of its objects to facilitate the detection and indication of alarm conditions in such systems.

One such an alarm condition arises when a large proportion of a limited number of pieces of equipment are taken for use. For example, where incoming calls are distributed to operators' positions and only a limited number of positions are in service, a large increase in the number of incoming calls is an indication that more positions need to be put into service. Similarly, in common control dial telephone systems, when a line originates a call but no dialing follows, the condition commonly known as a permanent signal condition arises and the calling line is connected to a permanent signal trunk. A large increase in the number of calls connected to such trunks may indicate a cable failure requiring immediate attention. Under such conditions it has been the custom to provide a network and to vary the potential at a point in this network in accordance with the number of unanswered incoming calls or in accordance with the number of permanent signal trunks in use. When a potential indicating such an undesirable condition arises, means is provided for sounding an alarm. This means has previously been a voltmeter relay, requiring accurate and frequent adjustment. It is, of course, possible that an excess of other minor troubles might be indicated in a similar manner, by varying the potential on a network.

A feature of the invention lies in means for using a variable potential generated under conditions such as above described to charge a condenser and intermittently discharging the condenser through a circuit which controls the input of an electron device, this device being adjusted to respond when the charge on the condenser indicates that an undesired condition has arisen.

In accordance with a further feature of the invention, the sensitivity of the arrangement is increased by causing two condensers to be charged in parallel and discharged in series.

An additional feature of the invention lies in means to maintain the detecting circuit ineffective until at least one of the associated circuits is operated.

These and oher features of the invention will be more clearly understood from a consideration of the following description read in connection with the drawing which shows the invention as applied to the control of a permanent signal alarm.

In the typical usage illustrated, the invention may be regarded as an improvement on the alarm signaling arrangement disclosed in Patent 2,580,757 to C. E. Germanton, January 1, 1952.

Two permanent signal trunks 100 and 101 are indicated at the left of the drawing. When one of these trunks is taken for use, for example trunk 100, a busy relay 102 is operated, connecting ground over its upper armature to conductor 103 to start the interrupter circuit 104. At the same time, ground over the lower armature of relay 102 is connected through a 1,000-ohm resistor 105 to conductor 106, contact 2 of test key 107, to point 108 which is connected through a network comprising a simple resistance 109 to negative battery. Similarly relay 110 in trunk 101, when that trunk is taken for use, grounds conductor 103 and connects ground through 1,000-ohm resistor 111 to point 108. As additional permanent signal trunks are taken for use, other 1,000-ohm resistors are connected in parallel with resistors 105 and 111 to point 108. Since these resistors are connected in parallel, the effective resistance connected from the trunks to point 108 decreases, resulting in an increased potential across resistance 109.

Point 108 is also normally connected over contact 2 of relay 112 through condenser 113, contact 4 of relay 112 to negative battery and, in parallel therewith, over contact 9 of relay 112 through condenser 114, contact 7 of relay 112 to negative battery. Initially, therefore, condensers 113 and 114 will be uncharged since the potential connected to the two sides of the condensers is the same. As soon as one trunk is taken for use, point 108 will assume its minimum potential and condensers 113 and 114 will be similarly charged. As additional trunks are made busy, the potential across resistor 109 increases, and therefore the charge on condensers 113 and 114 increases.

After interrupter 104 is started, it connects ground to conductor 115 at intervals, for example, it may connect ground for 0.25 second to conductor 115 and remove it for approximately 25 seconds. When ground is connected to conductor 115, a circuit is completed over contact 2 of relay 116, contact 1 of relay 117, contact 3 of key 107 to battery through the winding of relay 118. Relay 118 operates in this circuit and closes an obvious circuit for relay 112. When relay 112 operates it closes a discharge circuit for condensers 113 and 114 which may be traced from the right side of condenser 113, contacts 5 and 6 of relay 112, condenser 114, contact 8 of relay 112, through resistor 119, contact 3 of relay 112, back to the left side of condenser 113. Condensers 113 and 114 discharge during the period that relay 112 is operated, creating a voltage drop in resistor 119 which varies in accordance with the charge in the condensers.

Resistor 119 is included in the control circuit for the gas-filled tube 120. The cathode of this tube is connected to a reduced negative battery potential provided by the potentiometer comprising resistors 121 and 122. The control anode of tube 120 is normally connected through resistors 123 and 119 and a variable part of resistor 124 to negative battery. The main anode of tube 120 is normally connected through the winding of relay 116, resistors 125 and 124 to negative battery. When relay 112 operates, it connects high potential positive battery to the winding of relay 116 and through resistors 125 and 124 to negative battery producing a positive potential at the control anode of tube 120. The potential normally connected to the control anode of tube 120 being negative prevents the discharge of tube 120. Resistors 125 and 124 are so selected that the potential on the control anode resulting from the operation of relay 112 is also insufficient by itself to cause tube 120 to become conducting. When condensers 113 and 114 discharge through resistor 119, the potential on the control anode increases, the tap on resistor 124 being so adjusted that the increase of potential due to the discharge of the condensers will bring the control anode of the tube to the breakdown potential only when a predetermined number of permanent signal trunks are in use.

If less than this critical number of trunks are busy and tube 120 does not break down, when the interrupter 104 removes ground from conductor 115, relays 118 and 112 release and condensers 113 and 114 are again charged to the potential of point 108. If more than the critical number of trunks are busy and tube 120 breaks down, relay 116 operates, connecting ground over its contact 1, contact 5 of test key 107 to battery through the winding of relay 117. Relay 117 operates and locks over its contact 2 under the control of the alarm sending circuit 126. At its contact 1, relay 117 opens the operating circuit for relay 118 causing relays 118 and 112 to release. The release of relay 112 disconnects battery from the winding of relay 116 causing relay 116 to release and tube 120 to be extinguished. With relay 117 operated the operation of the alarm detecting circuit is suspended while the alarm is being transmitted.

At its contacts 4 and 5, relay 117 connects ground to the alarm sending circuit 126 to cause an alarm to be sent to a maintenance desk. It also, at its contact 6, lights lamp 127. When the alarm has been received at the maintenance desk and noted, the locking circuit of relay 117 is opened and that relay releases to permit the permanent signal alarm circuit to again become effective.

Since permanent signals may not occur and the tube 120 may not be operated for long periods of time, the tube is kept in operative condition by the connection of 20-cycle ringing current over a back contact of relay 118, through condenser 128 and resistor 129 to the control anode. This circuit is opened each time that relay 118 operates and the circuit of relay 116 is only closed when relay 112 operates following the operation of relay 118. Therefore no false alarms can be caused by this intermittent activation of the tube 120.

The circuit may be adjusted to respond to any desired number of permanent signals by means of test switch 132, test key 107 and test resistors 133 to 137. Resistors 133 to 137 are selected to provide a resistance in the test circuit equivalent to that provided by various numbers of trunk circuits in the range to be detected. When the alarm arrangement is to be adjusted or reset for a different range, switch 132 is set to the range desired. Then the test key 107 is operated and released at intervals, for example at five-second intervals. At contact 1 of key 107 the test resistance is connected to point 108. At contact 2, conductor 106 leading to the trunk circuits is disconnected from point 108. At contacts 3 and 4, relay 118 is disconnected from interrupter 104 and connected to steady ground so that relays 118 and 112 operate in response to each operation of key 107. At contact 5 the circuit of the alarm relay 117 is opened. The potentiometer contact on resistor 124 is now adjusted until relay 116 operates consistently each time that key 107 is operated. The circuit is then ready to function in the range selected. Individual variation in components such as condensers and tubes are not a factor in the accuracy of the circuit, since the circuit is adjusted to the desired range, whenever required.

It will be apparent from the above description that the present circuit provides a simple and efficient means of continuously monitoring on a condition which varies from time to time and is undesirable only when it reaches a particular severity.

It may be noted that the alarm sending circuit 126 is especially designed for use at offices which are normally not attended. However, when a maintenance man visits such an office he may adjust the alarm sending circuit so that no alarms will be sent. Under this adjustment, relay 117 locks to a local ground and battery is connected to conductor 139 so that, if relay 117 operates, a circuit is closed from ground on conductor 139 through resistor 140, contact 3 of relay 117, contact 1 of relay 130 to a major alarm device (not shown). Having noted the cause of the alarm, the maintenance man may close key 131, completing a circuit from ground over contact 6 of relay 117, key 131 to battery through the winding of relay 130. Relay 130 locks over its contact 2 to ground at contact 6 of relay 117 and at its contact 1 opens the circuit of the alarm device to silence it. Relay 117 may be released and the permanent signal alarm arrangement returned to service by operating key 141.

What is claimed is:

1. In a telephone system, a network, means to vary the voltage at a point in said network in accordance with the severity of a trouble condition, an alarm, and means to operate said alarm in response to a predetermined severity of said trouble condition comprising a condenser, means for normally connecting said condenser to said network to charge said condenser to the voltage of said point, a discharge circuit for said condenser, a gas-filled tube, means for rendering said gas-filled tube responsive to a predetermined voltage on said discharge circuit, means for operating said alarm when said gas-filled tube is responsive, means for intermittently disconnecting said condenser from said point and connecting said condenser to said discharge circuit, an interrupter for controlling said disconnecting means and means for operating said interrupter only when said trouble condition exists.

2. In a telephone system, a plurality of permanent signal trunks, a network common to said trunks, means operated by any one of said trunks when in use to mark a point in said network with a predetermined voltage, said marking means effective as additional trunks are used to increase the voltage at said point, an alarm, and means to operate said alarm when a predetermined number of said trunks are simultaneously in use comprising a condenser, means for normally connecting said condenser to said network to charge said condenser to the voltage of said point, a discharge circuit for said condenser, a gas-filled tube, means for rendering said gas-filled tube conductive in response to a predetermined voltage on said discharge circuit, means for operating said alarm when said gas-filled tube is conductive, means for intermittently disconnecting said condenser from said point and connecting said condenser to said discharge circuit, an interrupter for controlling said disconnecting means and means for operating said interrupter only when one or more of said trunks is in use.

References Cited in the file of this patent

UNITED STATES PATENTS

| | | |
|---|---|---|
| 2,078,618 | Springer | Apr. 27, 1937 |
| 2,194,072 | Humphries | Mar. 19, 1940 |
| 2,404,466 | Taylor et al. | July 23, 1946 |
| 2,421,943 | Hill | June 10, 1947 |